United States Patent
de Bayser et al.

(10) Patent No.: US 12,299,594 B2
(45) Date of Patent: May 13, 2025

(54) ARTIFICIAL INTELLIGENCE BASED MATERIALS DISCOVERY BUILDING FROM DOCUMENTS AND RECOMMENDATIONS

(71) Applicant: INTERNATIONAL BUSINESS MACHINES CORPORATION, Armonk, NY (US)

(72) Inventors: Maira G. de Bayser, Rio de Janeiro (BR); Geeth Ranmal de Mel, Warrington (GB); Mathias B. Steiner, Rio de Janeiro (BR); Mohab Elkaref, Manchester (GB); Ronaldo Giro, São Paulo (BR); Bruce Gordon Elmegreen, Goldens Bridge, NY (US); Christopher R. Gibson, Winchester (GB); David Boaz, Bahan (IL); David S. Braines, Fareham (GB); Dean Clarke, Warrington (GB); Dmitry Zubarev, San Jose, CA (US); Flaviu Cipcigan, Warrington (GB); Kristin Schmidt, Mountain View, CA (US); Lori French, Yorktown Heights, NY (US); Stacey Gifford, Ridgefield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1049 days.

(21) Appl. No.: 17/246,543

(22) Filed: Apr. 30, 2021

(65) Prior Publication Data
US 2022/0351056 A1   Nov. 3, 2022

(51) Int. Cl.
*G06N 5/04*   (2023.01)
*G06F 16/3329*   (2025.01)
(Continued)

(52) U.S. Cl.
CPC ........... *G06N 5/04* (2013.01); *G06F 16/3329* (2019.01); *G06F 16/35* (2019.01); *G06F 18/214* (2023.01); *G06N 5/022* (2013.01); *G06N 20/00* (2019.01)

(58) Field of Classification Search
CPC .......... G06N 5/04; G06N 5/022; G06N 20/00; G06F 16/3329; G06F 16/35; G06F 18/214
See application file for complete search history.

(56) References Cited

U.S. PATENT DOCUMENTS

| | | |
|---|---|---|
| 5,841,900 A | 11/1998 | Rahgozar et al. |
| 6,539,376 B1 | 3/2003 | Sundaresan et al. |

(Continued)

FOREIGN PATENT DOCUMENTS

EP   3104302 B1   5/2018

OTHER PUBLICATIONS

Lowe et al. "Extraction of reactions from patents using grammars". In Central Europe Workshop Proceedings (CEUR-WS) 2020 (Year: 2020).*

(Continued)

*Primary Examiner* — Jesse S Pullias
(74) *Attorney, Agent, or Firm* — Intelletek Law Group, PLLC; Gabriel Daniel, Esq.

(57) ABSTRACT

A computer implemented method for generating query results includes generating by a computer processor, a training model through artificial intelligence. The training model is based on annotated data. A knowledge base for a subject matter is generated based on the training model. The knowledge base is based on content from document sources related to the subject matter. A natural language query input is received. An intent and requirements for satisfying the intent is inferred by the computer processor. The knowledge (Continued)

base is referenced to extract information related to the intent and requirements, from documents in the knowledge base. Relationships between the extracted information and the requirements are correlated from the documents in the knowledge base. Query results are displayed to the user. The query results are based on the correlated relationships.

17 Claims, 14 Drawing Sheets

(51) Int. Cl.
   *G06F 16/35* (2019.01)
   *G06F 18/214* (2023.01)
   *G06N 5/022* (2023.01)
   *G06N 20/00* (2019.01)

(56) References Cited

U.S. PATENT DOCUMENTS

| | | |
|---|---|---|
| 7,523,128 B1 | 4/2009 | Miller et al. |
| 10,685,462 B2 | 6/2020 | Bekas et al. |
| 10,706,362 B2 | 7/2020 | Gordon et al. |
| 10,885,323 B2 | 1/2021 | Staar et al. |
| 2013/0007020 A1 | 1/2013 | Basu et al. |
| 2014/0082003 A1 | 3/2014 | Feldman et al. |
| 2015/0347467 A1* | 12/2015 | Basson ............. G06F 16/355 707/769 |
| 2020/0133964 A1* | 4/2020 | Lee ................. G06F 16/355 |
| 2020/0234698 A1* | 7/2020 | Selvaggi ............ G10L 15/22 |
| 2022/0165414 A1* | 5/2022 | Dehan ............... G16H 70/00 |

OTHER PUBLICATIONS

Hawizy et al. "ChemicalTagger: A tool for semantic text-mining in chemistry". Journal of Cheminformatics 2011 (Year: 2011).*

Single et al. "Knowledge acquisition from chemical accident databases using an ontology-based method and natural language processing". Safety Science 129 (2020) 104747 (Year: 2020).*

Mell, P. et al., "Recommendations of the National Institute of Standards and Technology"; NIST Special Publication 800-145 (2011); 7 pgs.

* cited by examiner

ARTIFICIAL INTELLIGENCE BASED MATERIALS DISCOVERY BUILDING FROM DOCUMENTS AND RECOMMENDATIONS

BACKGROUND

Technical Field

The present disclosure generally relates to networking systems, and more particularly, to system and method for artificial intelligence based materials discovery from documents and recommendations.

Description of the Related Art

There are shortcomings in scientific research related to researchers knowing what elements to work with for a given subject. While A.I. has been previously used to assist in analyzing data, researchers are generally left with supplying the initial assumptions to tackle a problem. Assuming a hypothesis, a researcher may for example, formulate a roadmap with experiments. In many cases, the researcher may draw on information from articles using specific search criteria. However, this approach may leave out many important sources of data because search criteria may not account for synonyms or alternative expressions of a material or other article.

In addition, the quality of a search may be limited to the content of a database being searched. While many database services exist, the services need to correlate content in their documents to the actual query subject of a researcher. Many databases rely on simple keyword searching. Keyword searches may not account for context of the search word(s) being used. What may occur are results being returned that have little relevance or correlation to the search subject.

SUMMARY

According to an embodiment of the present disclosure, a method for generating query results is provided. The method includes generating by a computer processor, a training model through artificial intelligence, wherein the training model is based on annotated data extracted from a training set of documents. A knowledge base for a subject matter may be generated based on the training model. The knowledge base may be based on content from a plurality of document sources related to the subject matter. A natural language query input from a user may be received by a computer processor. An intent and requirements for satisfying the intent from the natural language query input may be inferred by the computer processor. The knowledge base may be referenced by the computer processor to extract information related to the intent and requirements for satisfying the intent, from documents in the knowledge base. Relationships between the extracted information and the requirements for satisfying the intent may be correlated from the documents in the knowledge base. In addition, query results may be displayed to the user. The query results are based on the correlated relationships.

In one embodiment, the extracted information includes synthetic language representations of chemical substances. As may be appreciated, this is an improvement over current searching techniques which look explicitly for keywords in a search. Since many documents use synthetic language representations of chemical substances, the search capability is expanded without a user needing to know every form used to identify a chemical substance when entering a search query.

According to an embodiment of the present disclosure, a computer program product for generating query results is provided. The computer program product includes one or more computer readable storage media, and program instructions collectively stored on the one or more computer readable storage media. The program instructions include generating by a computer processor, a training model through artificial intelligence, wherein the training model is based on annotated data extracted from a training set of documents. A knowledge base for a subject matter may be generated based on the training model. The knowledge base may be based on content from a plurality of document sources related to the subject matter. A natural language query input from a user may be received by a computer processor. An intent and requirements for satisfying the intent from the natural language query input may be inferred by the computer processor. The knowledge base may be referenced by the computer processor to extract information related to the intent and requirements for satisfying the intent, from documents in the knowledge base. Relationships between the extracted information and the requirements for satisfying the intent may be correlated from the documents in the knowledge base. In addition, query results may be displayed to the user. The query results are based on the correlated relationships.

According to one embodiment, the program instructions further include generating a suggested query string based on the documents, wherein the documents are gathered from published papers, a corpus of papers representing a calibration standard for the content, and/or saved search data. By generating a suggested query string, a user's research may be strengthened and guided to look in different directions or with different nuances that may provide additional material previously not considered.

According to an embodiment of the present disclosure, a computer server includes: a network connection; one or more computer readable storage media; a processor coupled to the network connection and coupled to the one or more computer readable storage media; and a computer program product including program instructions collectively stored on the one or more computer readable storage media. The program instructions include generating by a computer processor, a training model through artificial intelligence, wherein the training model is based on annotated data extracted from a training set of documents. A knowledge base for a subject matter may be generated based on the training model. The knowledge base may be based on content from a plurality of document sources related to the subject matter. A natural language query input from a user may be received by a computer processor. An intent and requirements for satisfying the intent from the natural language query input may be inferred by the computer processor. The knowledge base may be referenced by the computer processor to extract information related to the intent and requirements for satisfying the intent, from documents in the knowledge base. Relationships between the extracted information and the requirements for satisfying the intent may be correlated from the documents in the knowledge base. In addition, query results may be displayed to the user. The query results are based on the correlated relationships.

According to one embodiment, the program instructions for the computer server further include identifying verbs in the document or file; correlating the identified verbs with chemistry related actions; and determining chemical reactions from the document or file based on the correlation between the identified verbs with chemistry related actions. By identifying verbs or actions in materials, a user is provided with information about chemical reactions including, for example, various ways of achieving a chemical reaction or different processes that involve a chemical reaction.

As may be appreciated, aspects of the subject technology may build corpus results related to the search query subject. Some embodiments may use artificial intelligence modeling and training of A.I. modeling, which may identify which documents or data in documents are relevant to the subject. The modeling and additional training may more accurately return relevant results. In some embodiments, the system may provide benefits to materials discovery. Materials relevant to a search query may be uncovered from documents to strengthen the relevancy of search results. The search query may not necessarily be specific. The benefit of using A.I. driven corpus building and searching allows the system to machine discover possible results related to the unspecific search terms more extensively than a manual search or a keyword driven search. A correlation between the data content and the search subject may be determined so that results better match the user query. In some embodiments, the system may generate recommendations related to the search query subject for the user's further consideration.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for search query retrieval using artificial intelligence modeling. Generally, the embodiments may be practiced in the fields of computers and computer networks. In one exemplary application, the embodiments may be practiced in the field of physical and chemical sciences including physics, chemistry, bio-chemistry, and biology.

In the subject disclosure that follows, embodiments propose a system and methods which correlate data represented in documents to search queries. The search queries may be ambiguous or hypothetical. Aspects of the subject technology, receive the search query subject, may build a query definition, search documents and files related to the search query, may build a corpora of databases related to the search query subject, extract data from the documents and files related to the search query subject, may build models for relating data in the documents to the search query subject, and may provide recommendations as output to the querying user. Some recommendations may be in the form of modified or suggested new query strings. Some applications may be related to the fields of materials discovery. Some recommendations may be in the form of suggested chemical substances, related chemical reactions or experiments, and experiment designs (along with estimated associated costs). It will be appreciated that aspects of the subject technology include unconventional elements including for example, generating recommendations for further querying using predictive modeling, determining materials' synthesis discovery and recommendations for synthesis, and recommending suggested experiment designs. These are but a few examples where others are disclosed below.

While the following is described generally in the context of chemistry, it will be understood that other science field applications may use the subject technology. It should also be noted that the term "chemicals" as used herein may also refer to biological materials including for example proteins and other organic matter.

Example Architecture

Figure 1:
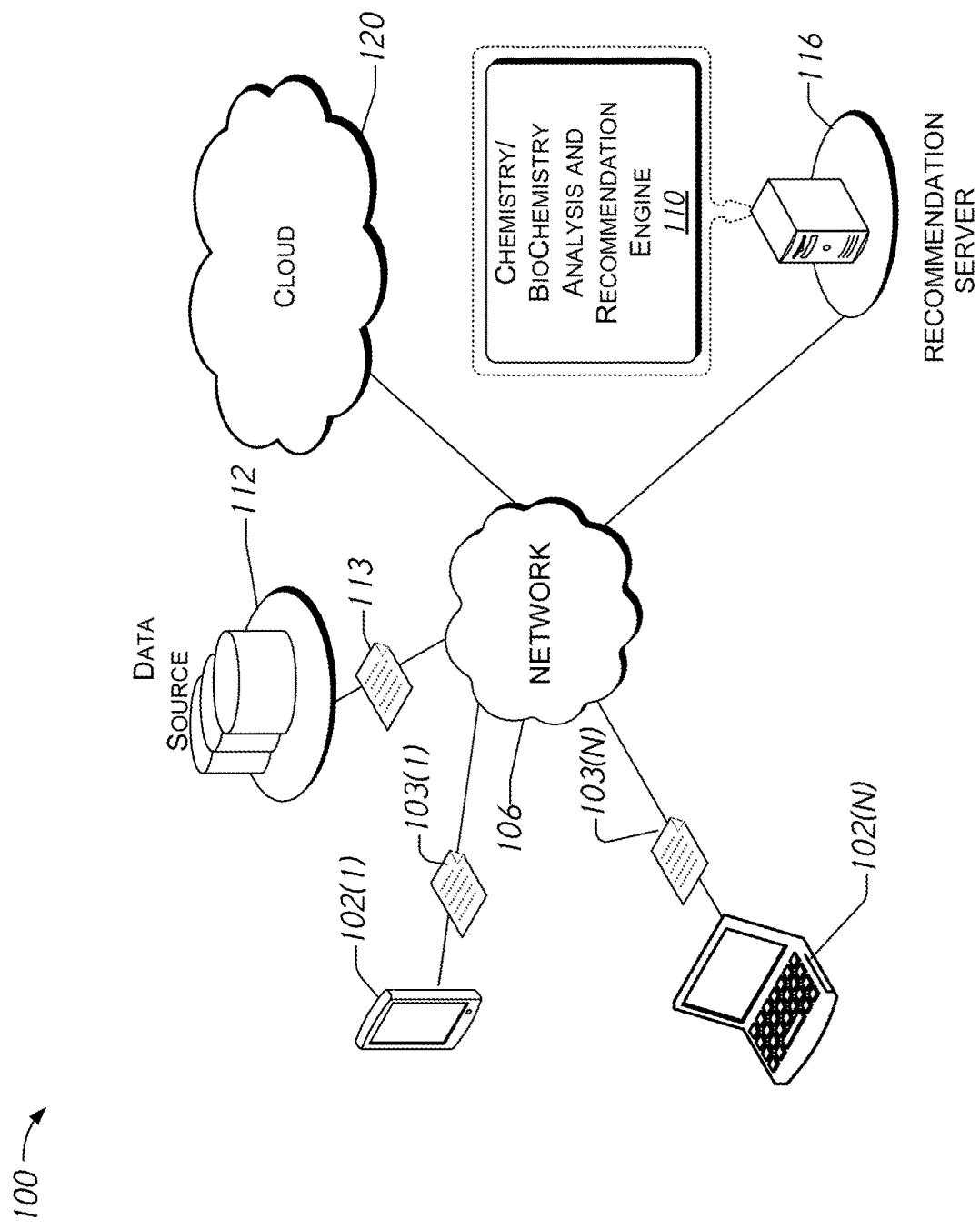
FIG. 1 is a block diagram of an architecture for generating query results and recommendations from a knowledge base of documents according to an embodiment.

FIG. 1 illustrates an example architecture 100 for software upgrade stability recommendations and scheduling. Architecture 100 includes a network 106 that allows various computing devices 102(1) to 102(N) to communicate with each other, as well as other elements that are connected to the network 106, such as update data source 112, a recommendation server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows a chemistry/biochemistry analysis and recommendation engine 110 (sometimes referred to simply as the "recommendation engine 110"), which is a software program running on the recommendation server 116, to communicate with the data source 112, computing devices 102(1) to 102(N), and the cloud 120, to provide data processing. The data source 112 may provide data from database sources including for example, Internet pages, external databases, internal databases, and corpora of documents/files that will be used for one or more techniques described herein. In an exemplary embodiment, artificial intelligence is one technique used for processing the data to build predictive models and in some embodiments, generate recommendations and suggested query strings. In one embodiment, the data processing is performed at least in part on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the update recommendation engine 110 of the update recommendation server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a query request 103(N) to the recommendation engine 110 to identify subject matter related to a query. An example of a query application may be a hypothesis search. For example, a user may input the hypothesis-based query: "Membrane cells that require the shortest time for capturing Carbon Dioxide", and the system may generate evidence for that hypothesis with papers that demonstrate the shortest time compared to other technologies. That time may be calculated from all chemical reactions time identified in the papers. Other chemistry related data extracted from the papers may be used to build a materials discovery knowledge database (MDKD). The MDKD data may be used in predictive models that may generate future query recommendations or results. In some embodiments, the models may extract domain knowledge from the documentation and may convert it to classes of string representations which enables discovery of for example, materials' synthesis discovery.

While the data source 112 and the recommendation engine 110 are illustrated by way of example to be on different platforms, it will be understood that in various embodiments, the update data source 112 and the recommendation server 116 may be combined. In other embodiments, these computing platforms may be implemented by virtual computing devices in the form of virtual machines or software containers that are hosted in a cloud 120, thereby providing an elastic architecture for processing and storage.

Example Methodology

In the following methods, flowcharts are shown to help describe the processes involved. The flowcharts may be shown as divided into sections showing which entity types may perform certain steps in a process. However, it should be understood, that while some examples show human users performing some steps, some embodiments may instead perform those user shown steps by a machine (for example, a computer processor or other automated device or in some embodiments, a software application). As will be appreciated, certain aspects of the subject technology are necessarily rooted in computer technology (e.g., must be performed by a computing device) in order to overcome a problem specifically arising in the realm of computer related technology. For example, as will be seen below, some aspects use A.I. to model and train models which locate sources of information ambiguously related to a search query. Aspects identify various sources which contain information related to the query subject where different identifier forms may be used to identify the same subject. In addition, different related sources (for example, from different fields) related to a subject may be identified by the computer technology where a human could not reasonably or practically be able to do so by reviewing all the documents, research, etc., in a reasonable amount of time because a human may not normally look to these other fields. In addition, some steps may be described as performed by "the system" which may be interpreted in some instances as being perform by a machine or computing device implementing executable instructions.

Figure 2A:
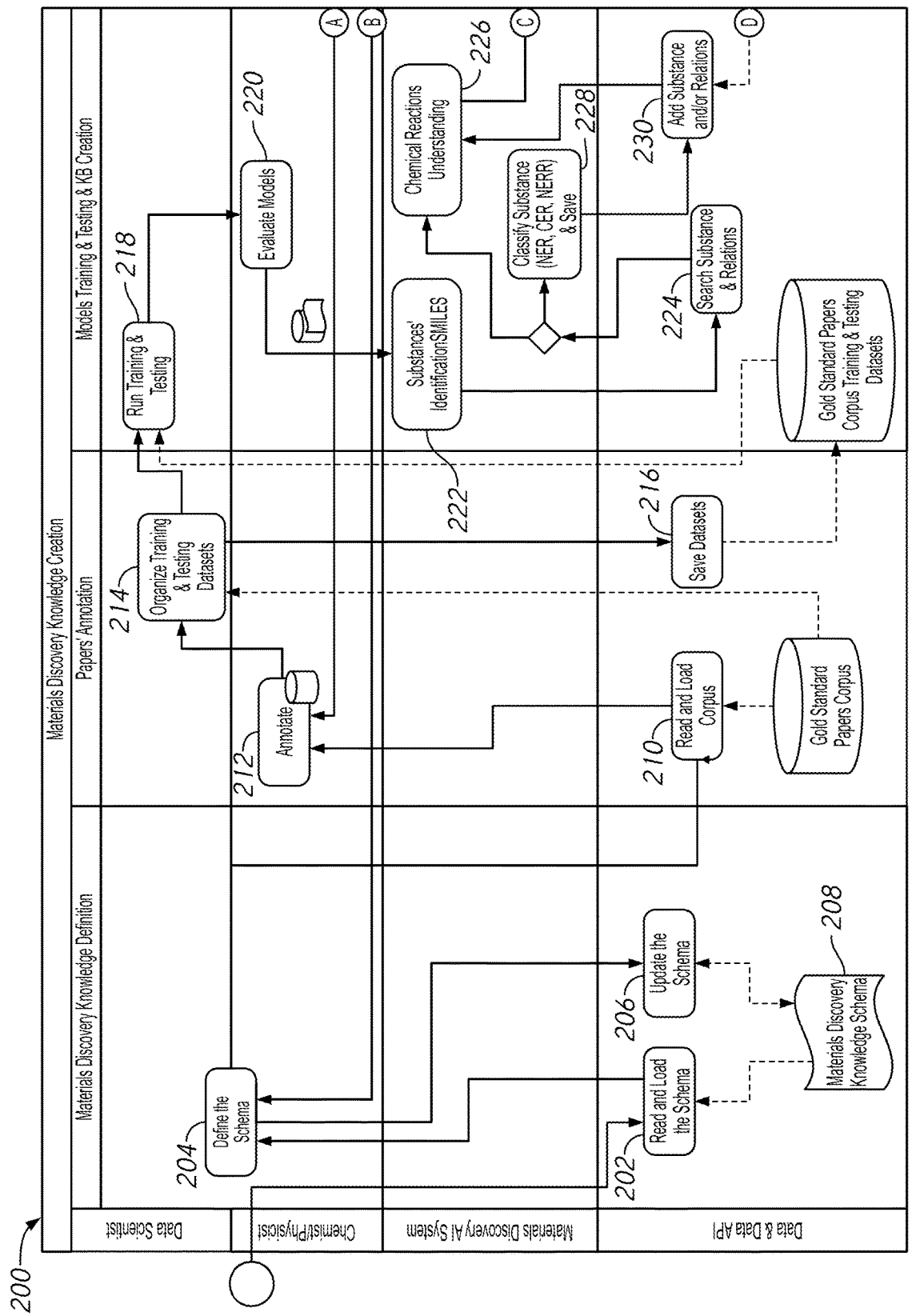
FIGS. 2A and 2B are a flowchart of a process for building a materials discovery knowledge base according to some embodiments.
Figure 2B:
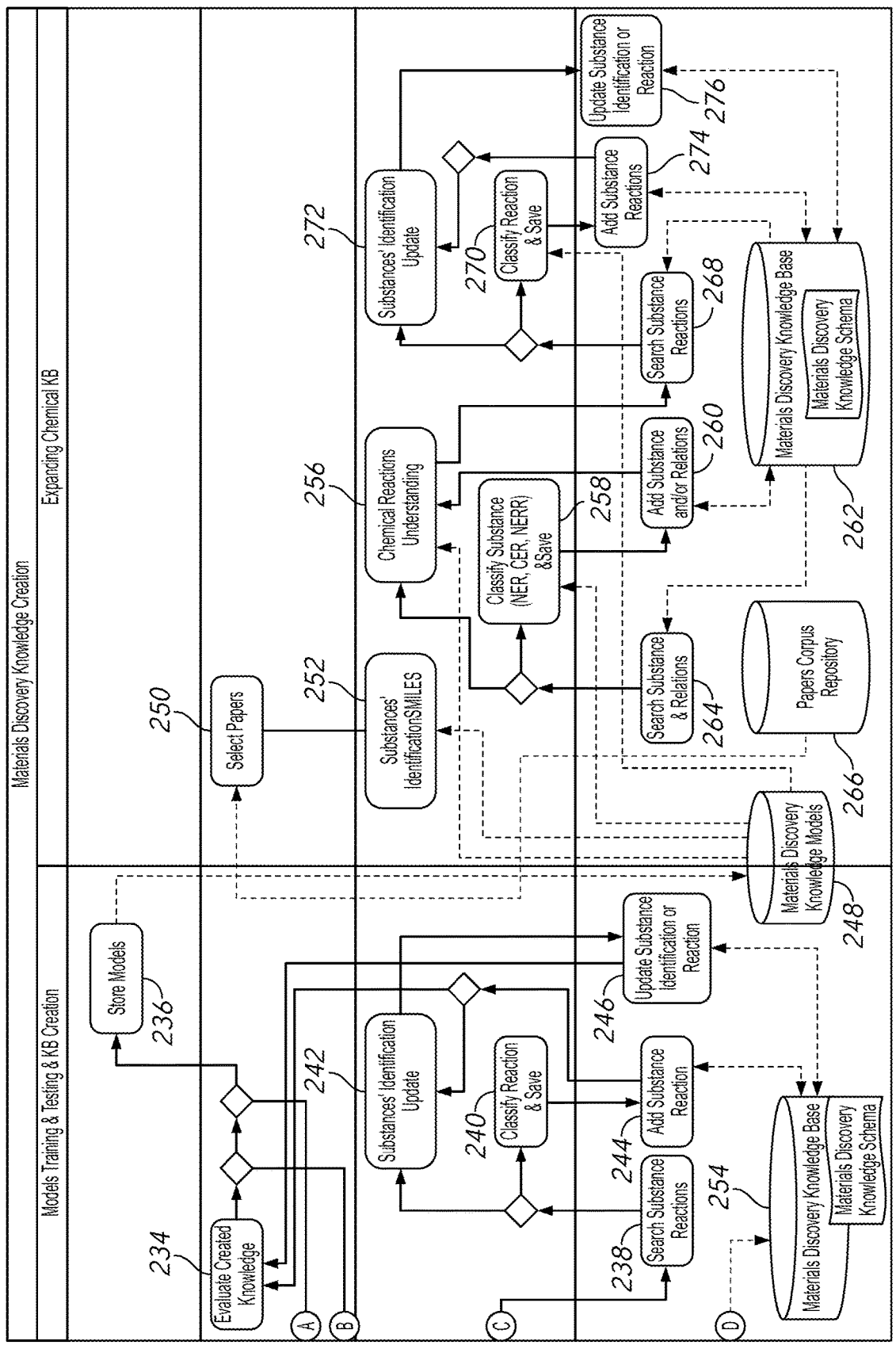

Referring now to FIGS. 2A and 2B, a method 200 for building a materials discovery knowledge base. While the following describes generally how to build a materials discovery database, it may be helpful to review the steps in the context of a query submitted by a user where the system is building up evidence and correlating the gathered data in relation to the query subject. When reviewing the flowchart of method 200, one can see that the flow is divided into sections that represent the various steps that different parties may perform at various stages. The rows in the flowchart may be divided between users (data scientist/chemist/physicist/biologist or hybrid combination of any two or more of the above), the machine elements (Materials discovery system and/or artificial intelligence system), and data/data API. The stages may include in an exemplary embodiment, Materials Discovery Knowledge Definition; Papers Annotation; Models Training, Testing, and Knowledge Base Creation; and Expanding Chemical Knowledge Base.

Figure 4A:
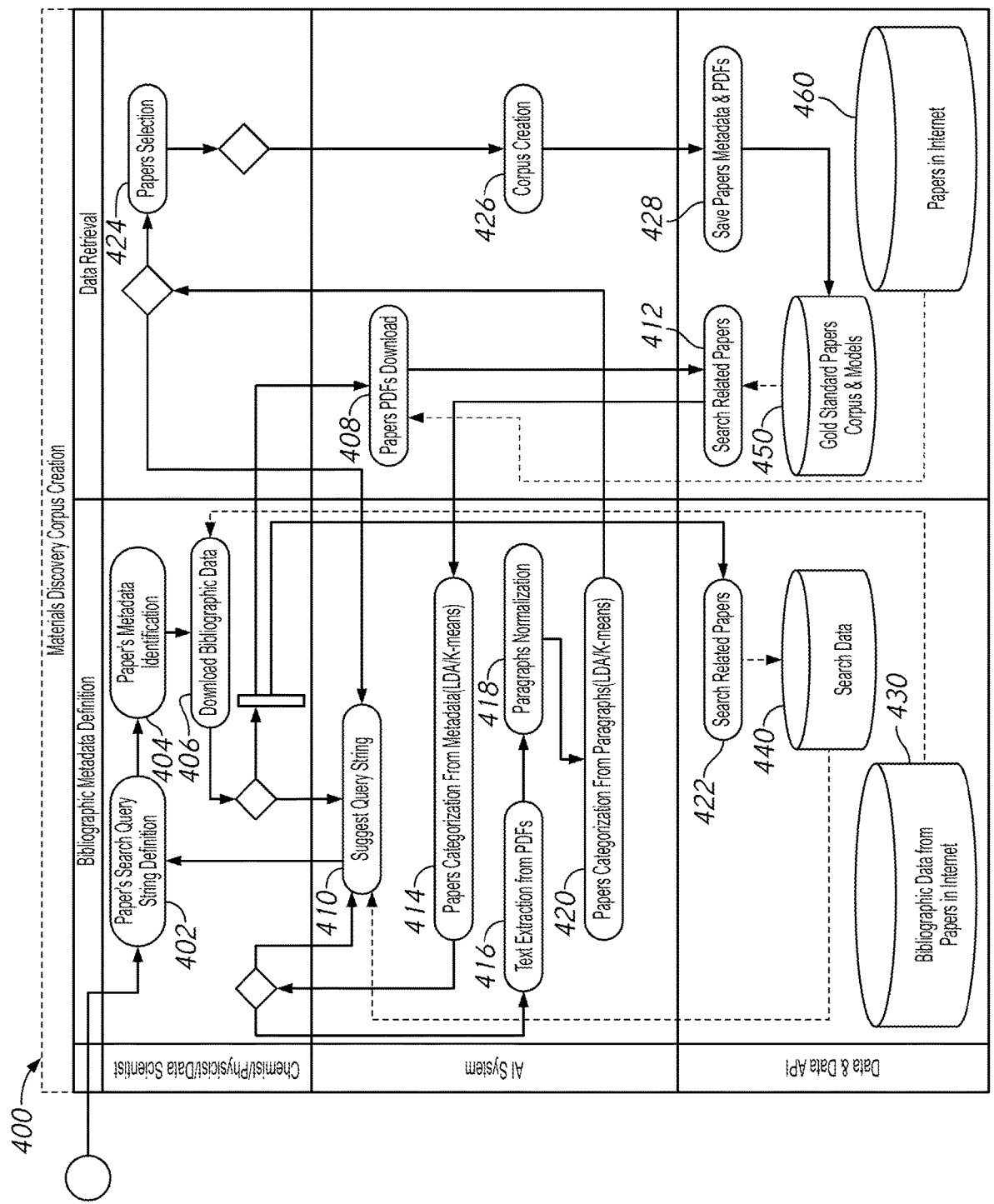
FIGS. 4A and 4B are a flowchart of a method for building a materials discovery corpus according to an embodiment.

The method 200 may include reading and loading 202 the schema 208 for materials discovery. The schema may be defined 204 for the subject matter undergoing discovery. An example schema may be seen in FIGS. 5A and 5B. The schema 208 may be updated 206. When the schema 208 is defined, the method may include reading and loading 210 a corpus of documents or files related to the subject matter. The method may annotate 212 the content in the documents pulled from the corpus. The annotated data may be organized 214 into training and testing datasets. In some embodiments, the datasets may be saved 216. Some embodiments may store a gold standard papers corpus used for training and testing dataset models. (An example gold standard papers corpus module 450 is shown in FIG. 4A). It should be understood that reference to a "gold standard" means that the corpus represents a calibration standard or metric to which other data may be measured against. The training and testing datasets may be run 218 generating predictive models. The models may be evaluated 220 for accuracy.

In an exemplary embodiment, the method 200 may be used, for example, to identify chemical substances in the content of documentation. Another embodiment for identifying chemical substances may be seen in FIG. 6, described more fully later in the disclosure. The machine side of the system may, for example, extract synthetic representations from the documentation. In an exemplary embodiment, the system may identify simplified molecular-input line-entry system unique notation in the content, for example, SMILES. The identified SMILES notation may be searched 224 against sources that identify the chemical substances associated with the SMILES notation. In some embodiments, the system may identify chemical relations between the identified substance and other entities in the MDKD's Knowledge Graph, which can be another substance, or a state variable, or a figure of merit, for instance, associated with the chemical compositions identified by the SMILES notation. Some embodiments may include classifying 228 discovered chemical substances and saving the classifications for future analysis. If a chemical substance is not in a database, the system may add 230 the chemical substance and/or chemical relations to storage.

In some embodiments, the system may identify 226 chemical reactions associated with the chemical substances and learn additional data from the reactions with the correlation of the identified reactions data. The system may search 238 for the same or similar chemical reactions. A reaction may be classified 240 and saved by the system. New chemical reactions may be added 244 to data storage. The system may update 242 identified substances. Saved identified substances and reactions may be updated 246 in data storage. Any identified subject matter related to the query and added to the materials discovery knowledge database 254 may also be added to data storage if not already stored. In some embodiments, as new chemical substances and/or reactions are updated or added, the knowledge created by the models may be evaluated 234 for consistency with the knowledge models. As models are updated or modified (in some embodiments by the users), the models may be stored 236 as materials discovery knowledge models 248 which may be used for future queries.

In some embodiments, the method 200 may include a stage of expanding the chemical knowledge base. The expansion phase may include selecting 250 papers from papers corpus repository 266. In an exemplary embodiment, the papers may be selected by the system to extract SMILES text or symbols present in the content. SMILES data may be identified 252 from the extracted content.

The materials discovery knowledge database 262 (which may be the same or an expanded version of the database 254) may be referenced when search 264 for chemical substances and reactions. The system may use the data to classify 258 substances and/or understand 256 chemical reactions found in the extracted content. In some embodiments, the materials discovery knowledge database 262 may be used to identify new chemical substances from searched 268 chemical reactions. Reactions may be classified 270 when discovered and the identification of chemical substances may be updated 272 in response to discoveries. As substance reactions are added 274 or updated 276, the materials discovery knowledge database 262 may be expanded.

Figure 3:
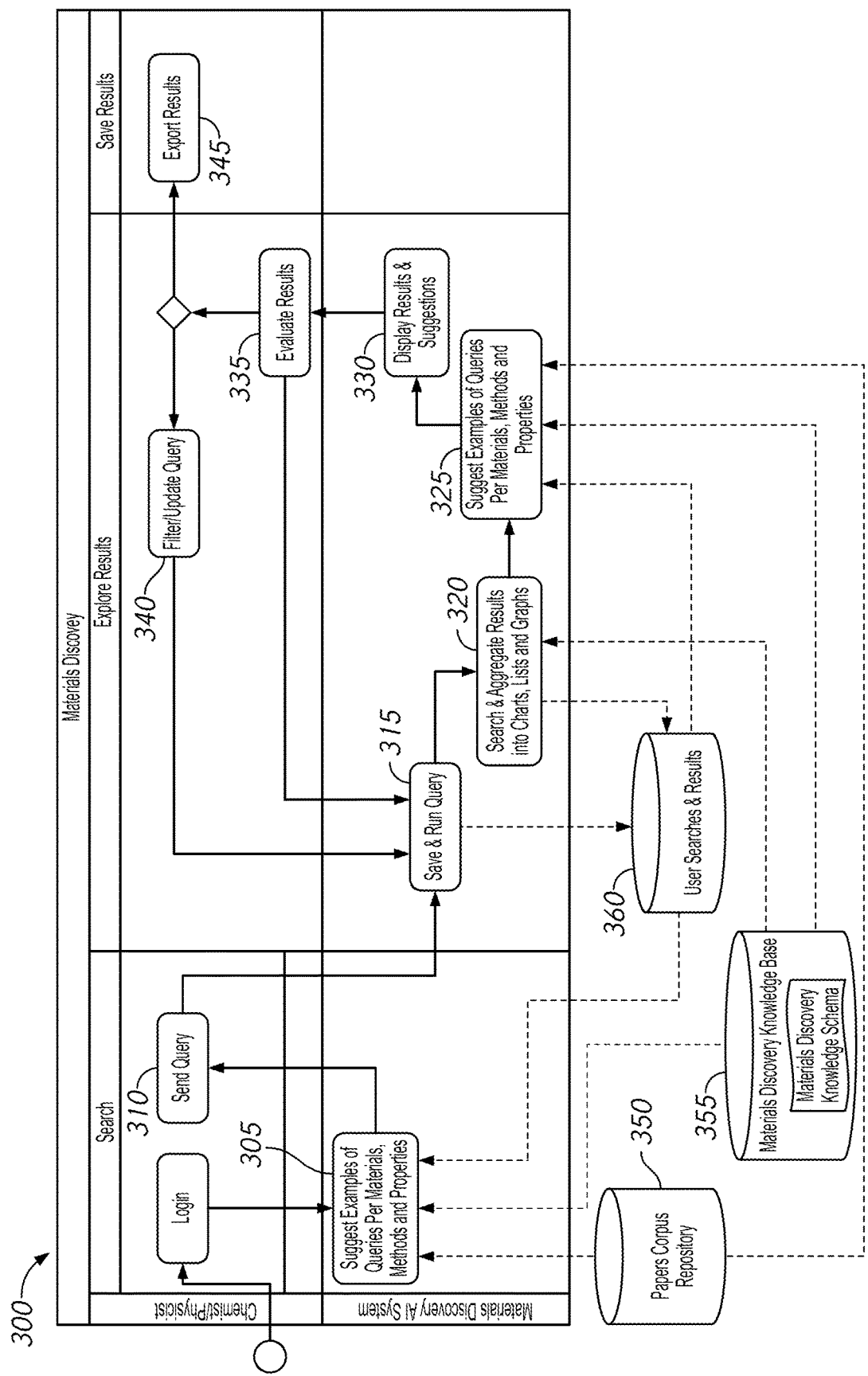
FIG. 3 is a flowchart of a method for materials discovery according to an embodiment.
Figure 5A:
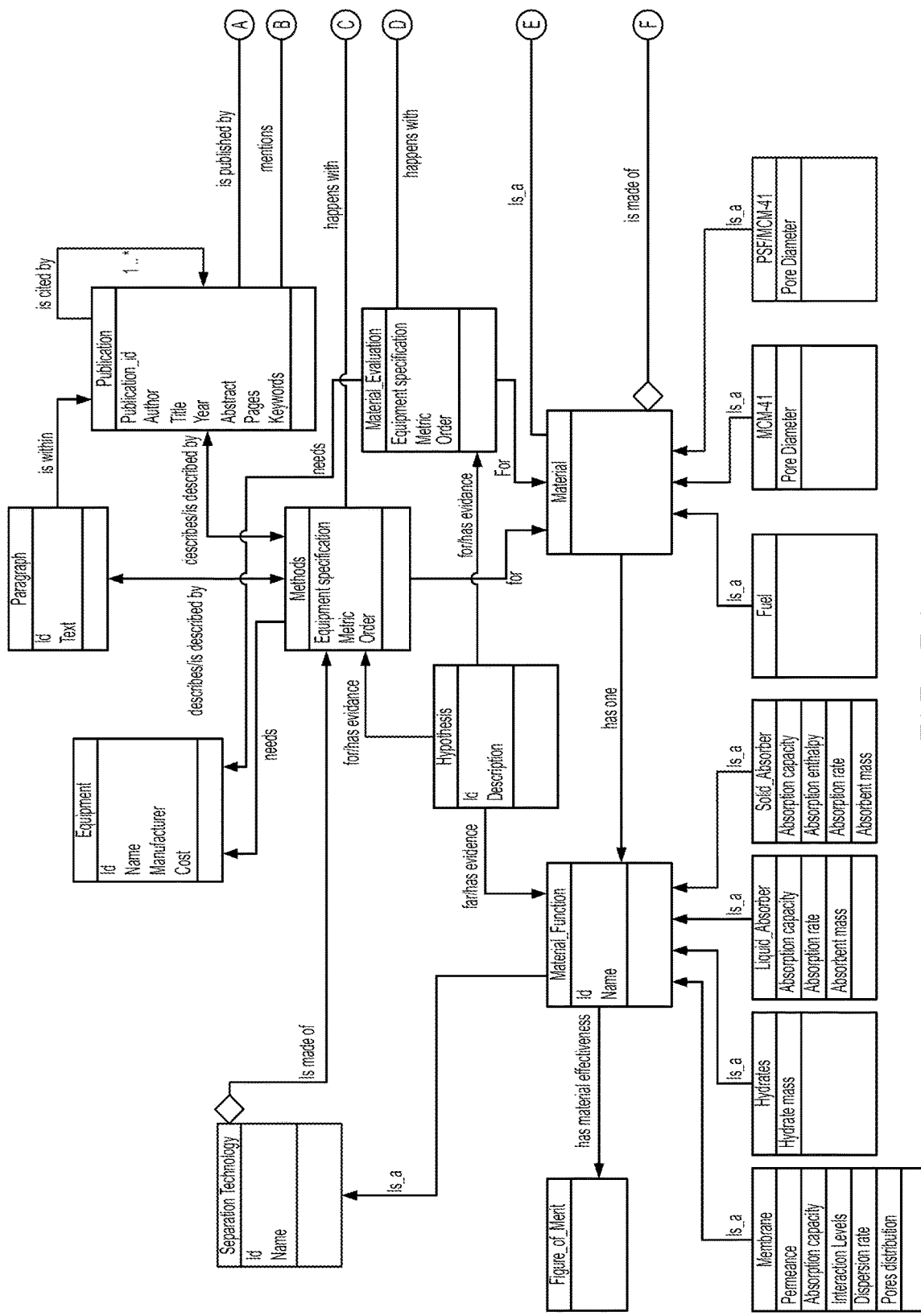
FIGS. 5A and 5B are a block diagram of a knowledge base schema according to an embodiment.
Figure 5B:
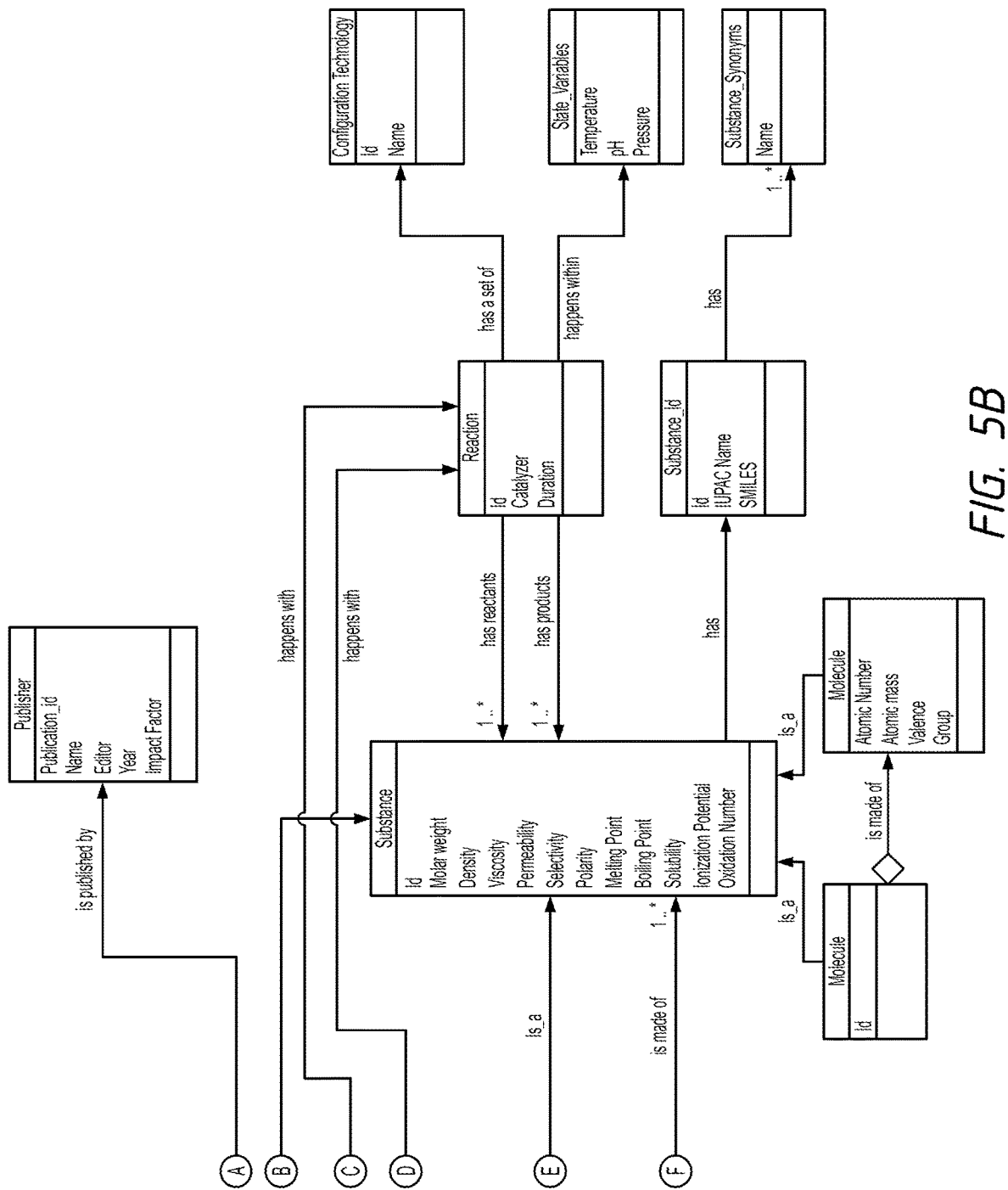

Referring now to FIG. 3, a method 300 for materials discovery is shown according to an embodiment. The method 300 may be used for example, within the overall method 200 of building up a materials discovery knowledge base and/or model(s). In an exemplary embodiment, the system may be configured to generate 310 suggested examples of query strings for the materials, methods, or properties that are the subject of a user's query topic as recommendations. The suggested examples of query strings may be for example, a hypothesis (FIG. 5A). The generated suggestions may be derived from data sources (for example, a paper corpus repository 350, a materials discovery knowledge database 355, and stored user searches and results 360. When a user has a query input (whether self-generated or automatically suggested by the system), the query may be sent 310 to the system for processing. The system may save and run 315 the query. Processing the query may include searching 320 through documents, files, data storage, online pages, and other repositories. In some embodiments, the results may be aggregated into visual metrics including for example, charts, lists, and graphs which give evidences for the hypothesis. The evidences may be materials functions and their effectiveness, methods for synthesizing the materials, materials evaluation. All of this may be identified in paragraphs of the documents (for example, per the schema of FIG. 5A). In some embodiments, the system may automatically suggest 325 additional queries/hypotheses based on the results of the previous phase of searching. The system may display 330 the results of suggested query strings and may suggest additional query strings. The results may be evaluated 335 by users who may filter or update 340 a query string. The filtered/update query may be processed iteratively as wanted. Results may be exported 345 to storage.

Figure 4B:
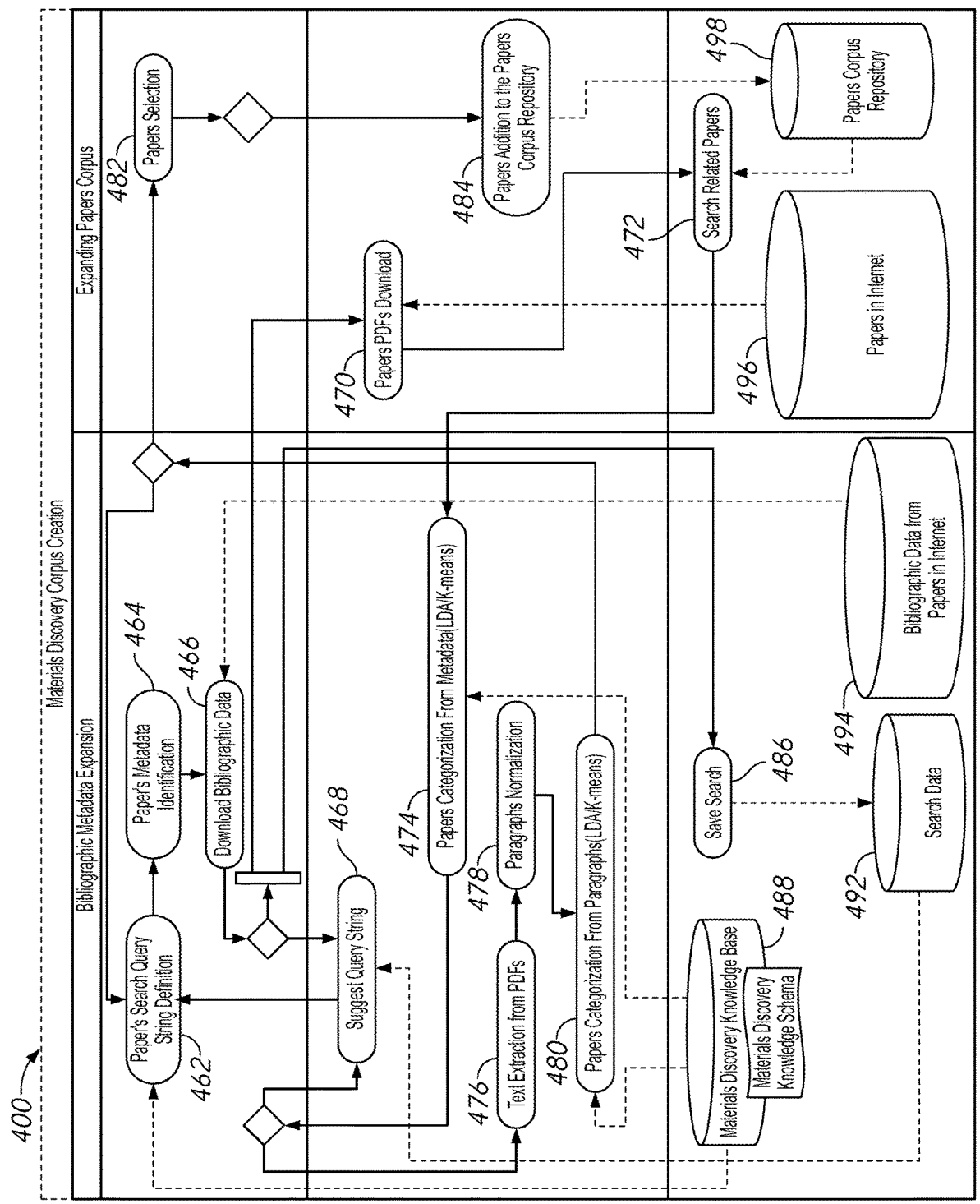

Referring now to FIG. 4A and 4B, a method 400 for building a materials discovery corpus is shown according to an exemplary embodiment. The method 400 may be used for example, within the overall method 200 of building up a materials discovery knowledge base and/or model(s). Similar to the method 200, the flowchart is broken up into rows depending on what type of entity may be performing a step in the process. In addition, the method 400 is shown in two halves across FIGS. 4A and 4B.

In initial steps of building up bibliographic metadata definitions, the user may enter 402 a search query string definition. Metadata in a paper may be identified 404. Bibliographic data may be downloaded 406 from a bibliographic database 430 that may include documents pulled from the Internet. The system may download 408 portable document format (PDF) documents or files (which may be retrieved for example from papers available on the Internet 460). The system may use character recognition to extract metadata from the documents. The system may search 412 a gold standard corpus and models module 450 for documents related to the search query string definition. In some embodiments, the system may look to the downloaded documents for determining which related documents from the corpus 450 may be retrieved. Relevant data may also be retrieved by searching 422 related documents retrieved from a search data storage module 440.

The downloaded documents and any retrieved searched documents may be categorized 414. In an exemplary embodiment, the system may use an (Latent Dirichlet Allocation) LDA/K means clustering method to categorize the documents based on the metadata previously captured. In some embodiments, the system may extract 416 text (or symbols) from the PDF documents.

Paragraphs in the PDF documents may be normalized 418 by an external source authority (for example, a dictionary). The documents may be categorized 420 based on the content of paragraphs. In an exemplary embodiment, the system may use an LDA/K means clustering method to categorize the documents based on the paragraph content as an embodiment, however any machine learning method for categorizing documents may be applied. Other example embodiments may include for example, context dependent/independent normalizations, and language and vocabulary-based normalization (for example, singular and plural terms to be collapsed into one category).

In some embodiments, the system may be configured to generate 410 a suggested query string. The suggested query string may be based on the categorization from metadata and/or paragraph content, stored search data 440, and/or the documents retrieved from the corpus and models module 450.

In response to executing the search query, or a suggested query, papers relevant to the query may be selected 424. Some of the selection may be based on the categorization based on paragraph content. The system may generate 426 a corpus from the selected papers. The corpus of papers may be saved 428 along with their metadata and PDF data to the corpus and models module 450.

In a bibliographic metadata expansion stage, a paper's search query string definition 462 may be generated. In some embodiments, the search query string definition may be retrieved from a materials discovery knowledge database 488. The definition may be used to identify 464 a paper's metadata content. Bibliographic data found in the metadata may be downloaded 466 from a bibliographic database 494. The bibliographic data may be for example, footnotes and citations which may include hyperlinks. Documents related to the search query may be categorized 474. In an exemplary embodiment, the system may use an LDA/K means clustering method to categorize the documents based on the metadata in the documents. In some embodiments, the system may extract 476 text (or symbols) from the PDF documents. Paragraphs in the PDF documents may be normalized 478 by a dictionary, for instance, but not limited to it. The documents may be categorized 480 based on the content of paragraphs. In an exemplary embodiment, the system may use an LDA/K type clustering method to categorize the documents based on the paragraph content.

In some embodiments, the system may be configured to generate 468 a suggested query string. The suggested query string may be based on the categorization from metadata and/or paragraph content, saved searches 486, stored search data 492, and/or the bibliographic data module 494.

In an expanding papers corpus stage, documents may be selected 482 based on the search query definition. The system may download 470 PDFs of papers and search 472 papers related to the query string in a papers corpus repository 498. Selected documents and searched/downloaded documents may be added 484 to the corpus repository 498.

Figure 6:
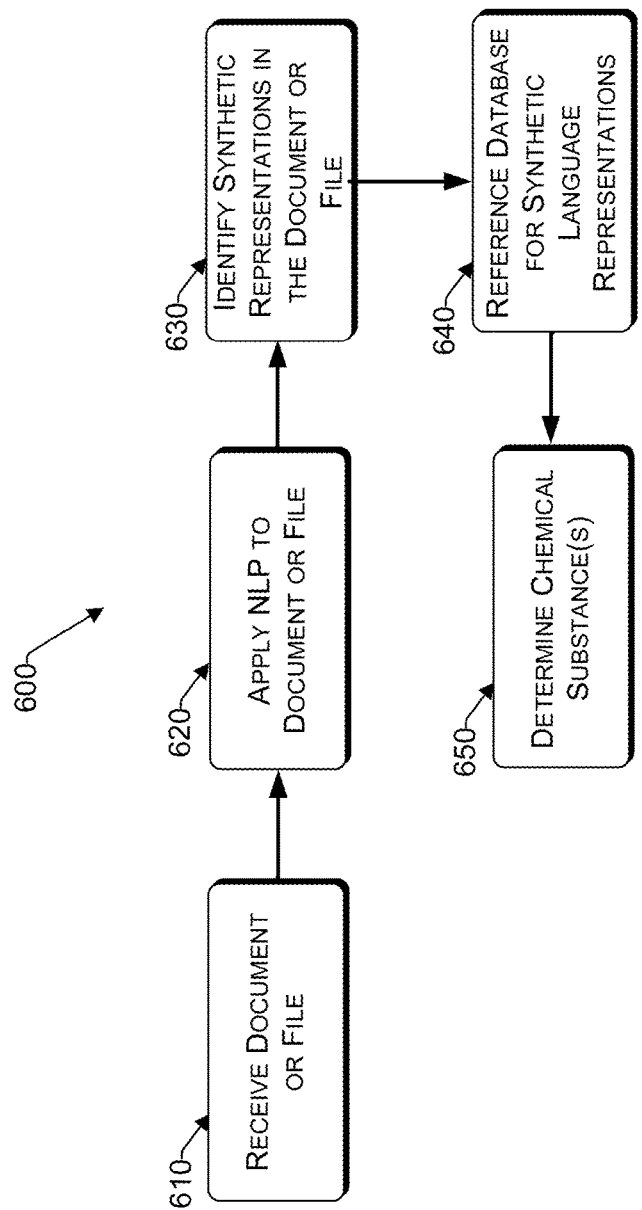
FIG. 6 is a flowchart of a method of identifying chemical substances present in documentation according to an embodiment.
Figure 7:
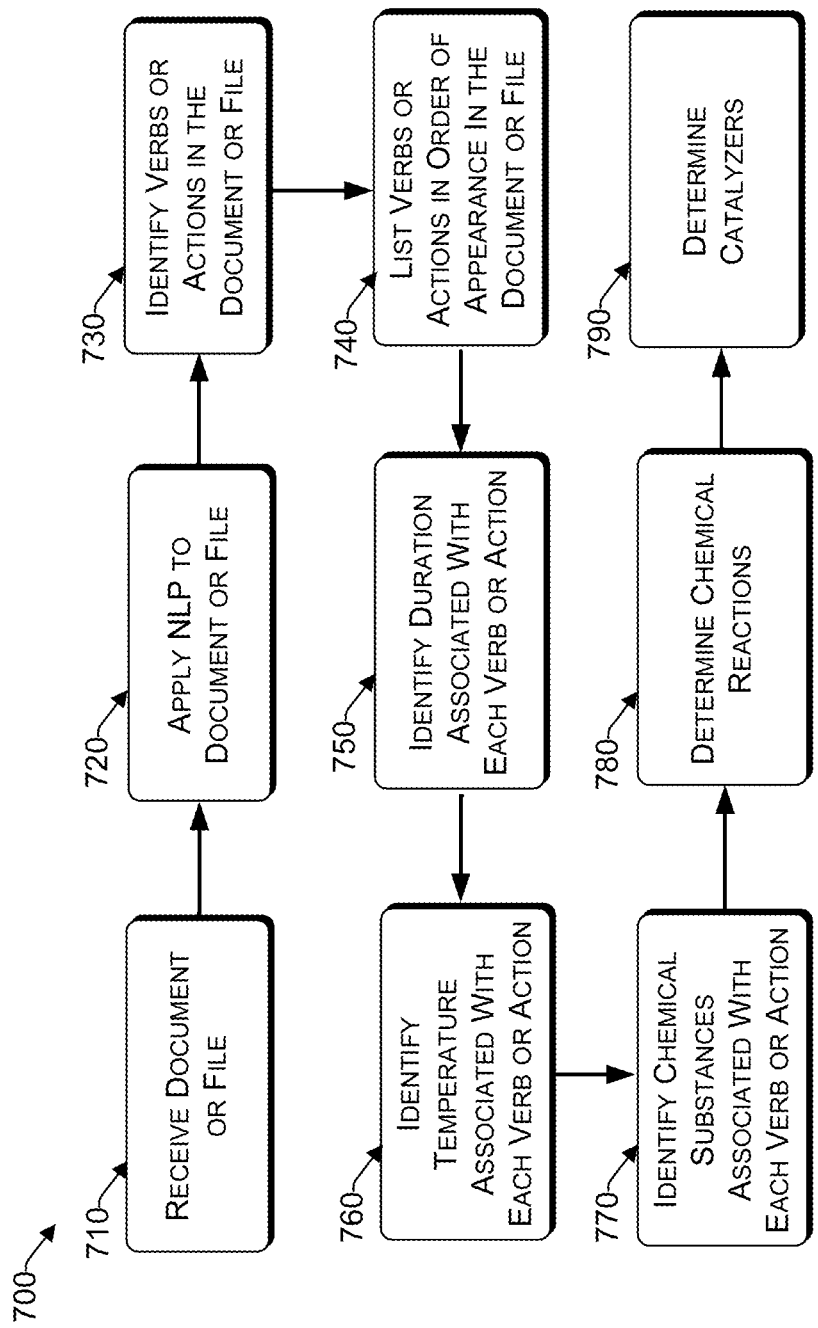
FIG. 7 is a flowchart of a method for identifying chemical reactions present in documentation according to an embodiment.
Figure 8:
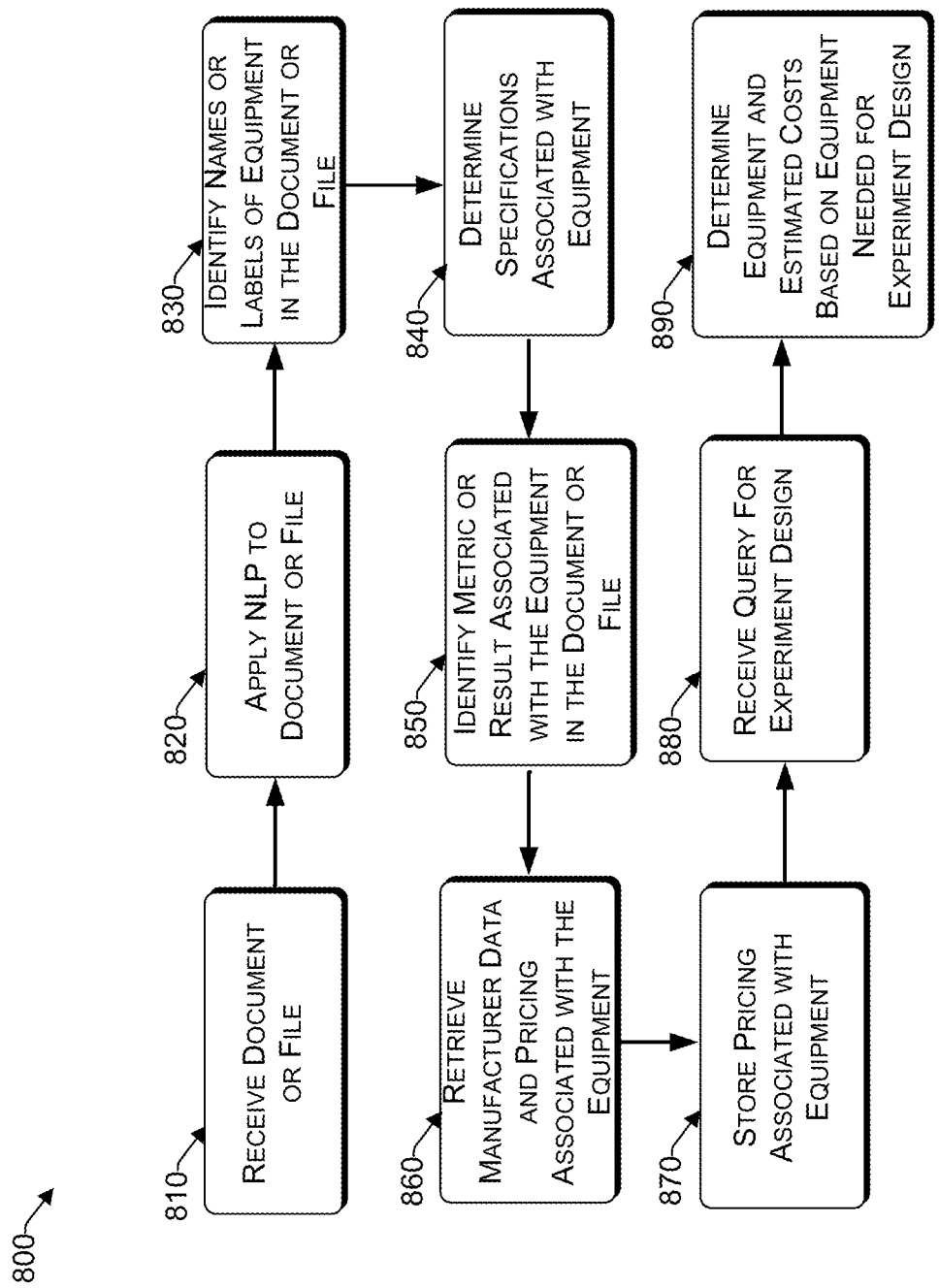
FIG. 8 is a flowchart of a method for estimating experiment design costs according to an embodiment.

FIGS. 6-8 show examples of the above-described system and methodology applied to chemistry related query tasks. While the benefits of the embodiments applied to chemistry related discovery tasks will be appreciated, it should be understood that some embodiments may be used for other applications as well and the following examples are not meant to limit the scope of the invention. In addition, it should be understood that a computing device or at least a computing processor in a device or an A.I. module may be performing most of the steps in the following.

In general, the methods below may be based on an initial step of receiving a search query. The query may not be for a specific or well defined subject. For example, a hypothetical query may be entered asking for targeted molecules and chemical reactions related to carbon dioxide capture. Implementations of the methods below using the subject technology described above may generate usable results with the aid of A.I. based modeling, training, and refining of the modeling.

Referring now to FIG. 6, a method 600 of identifying chemical substances present in documentation is shown according to an exemplary embodiment. A document or file may be received 610 in response to a search query. The document or file may be retrieved from the Internet, stored databases, and corpora built by the subject technology. The document or file may include, for example, text and symbols that may include description of chemicals. Generally, the document or file retrieved may have relevance to the query subject, which may be determined by aspects of the A.I. engine being used. In some embodiments, the document or file may include synthetic representations of chemicals. A natural language process (NLP) may be applied 620 to the document or file to process the content of the text and any symbols present. In some embodiments, text or symbols may be extracted from the content of the document or file. Using the result of the NLP, synthetic language representations in the document or file may be identified 630 from the extracted text/symbols. A database storing synthetic language representations may be referenced 640. The identified synthetic language representations may be matched to any stored definitions for the synthetic language representations. Chemical substances matching the definitions for identified synthetic language representations may be determined 650 and recommendations associated with the chemical substances may be provided to the querying user.

Referring now to FIG. 7, a method 700 of identifying chemical reactions present in documentation is shown according to an exemplary embodiment. A document or file may be received 710 in response to a search query. The document retrieval process may be similar to retrieval in FIG. 6 (and as described above in FIGS. 2A, 2B, 4A, and 4B). An NLP may be applied 720 to the document or file to process the content of the text and any symbols present. In some embodiments, text or symbols may be extracted from the content of the document or file. Using the result of the NLP, verbs or actions in the document or file may be identified 730. In, for example, scientific articles discussing chemical processes, the verbs or actions may be precursor language for steps performed in a chemical procedure. The system may determine which verbs or actions are followed by a chemistry related activity. In some embodiments, the verbs/actions may be listed 740 in the order in which they appear. The order may be helpful in future identification of chemical reactions and their associated processes. Some embodiments may identify additional details associated with the verbs or actions. Some embodiments may identify 750 the duration of a verb or action (for example, how long a heating or settling process takes). Some embodiments may identify 760 the temperature associated with a verb or action. The identified data may be recorded in a table. The identified data from the document or file may be compared to stored data to identify 770 chemical substances associated with the identified data. Using the identified chemical substances and associated identified verbs, actions (and in some embodiments, order of action, duration, or temperature), chemical reactions present in the document or file may be determined 780. Some embodiments may also determine 790 catalyzers present in the document or file from the identified data. Recommendations associated with the chemical reactions may be provided.

Referring now to FIG. 8, another exemplary application of the subject technology is shown. FIG. 8 shows a method 800 of determining experiment design costs according to an exemplary embodiment. Blocks 810-870 may be performed in response to a query or as part of a corpus building process to generate information results in response to a future query. As an initial step, a search query asking for estimated costs in performing a particular chemical process may be received. Documents or files related to the chemical process may be retrieved 810. An NLP may be applied 820 to the document or file to process the content of the text present. Using the result of the NLP, names or labels of equipment in the document or file may be identified 830. Specifications associated with the equipment may be determined 840 from the document or file. In some embodiments, the system may retrieve the specifications involved from other documents that use a piece of equipment similarly. A metric or result associated with a piece of equipment may be identified 850. The result or metric may be for example, some chemical reaction and the quantity (or resultant state) of substances involved. Manufacturer data may be retrieved 860 along with pricing associated with the piece of equipment (and all equipment associated with the query subject). The pricing associated with the equipment may be stored 870. In response to receiving 880 a query for an experiment design, the equipment involved and estimated costs for the equipment may be determined 890. Recommendations for designing the experiment, which may include for example, suggested equipment and sources may be provided. Some embodiments may also include determining the cost of materials involved by incorporating for example, the information identifying substances and reactions that will be associated with the experiment design from the methods 600 and 700 above.

Example Computer Platform

Figure 9:
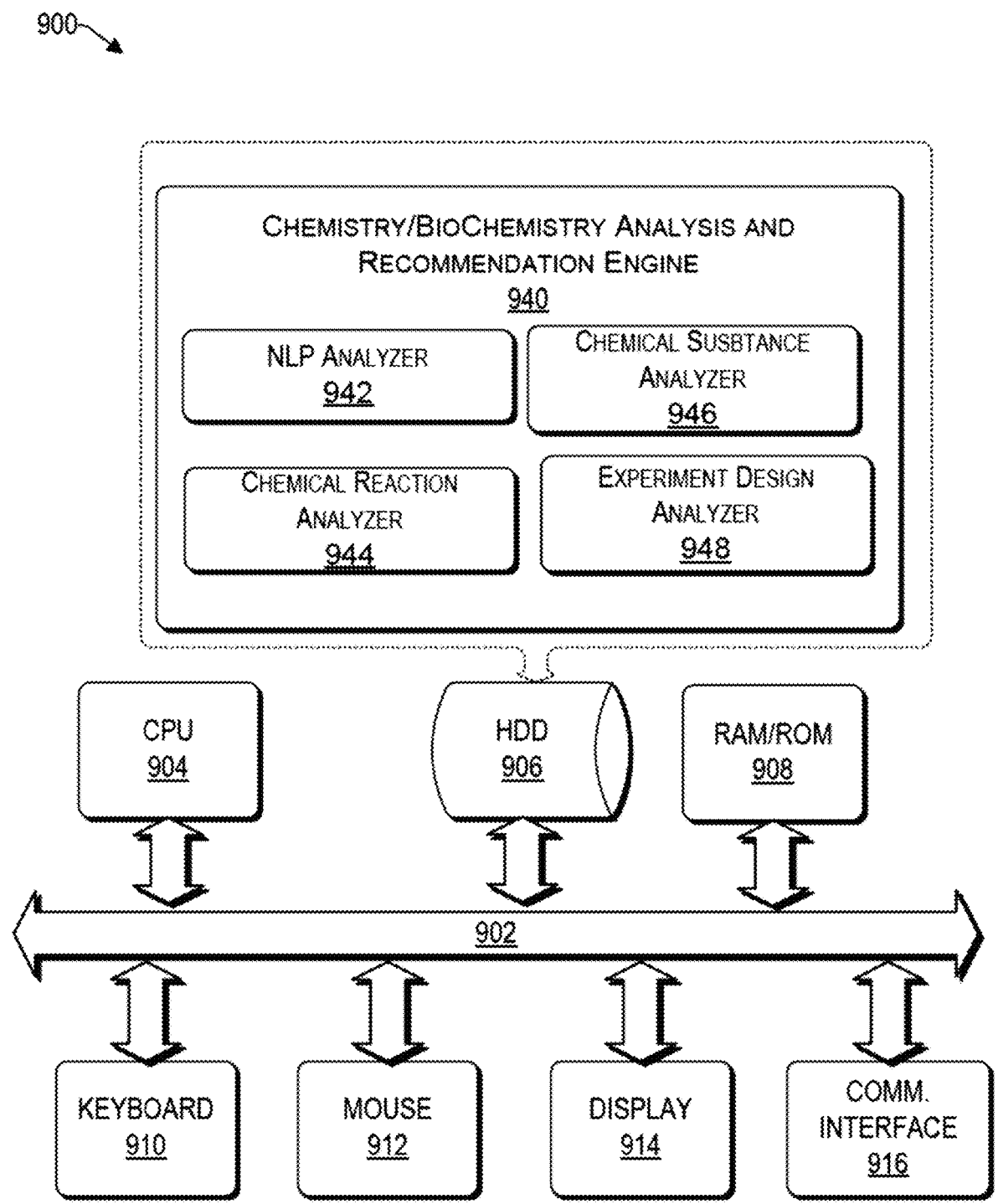
FIG. 9 is a functional block diagram illustration of a computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 9 is a functional block diagram illustration of a computer hardware platform that can communicate with various networked components, such as a training input data source, the cloud, etc. In particular, FIG. 9 illustrates a network or host computer platform 900, as may be used to implement a server, such as the recommendation server 116 of FIG. 1.

The computer platform 900 may include a central processing unit (CPU) 904, a hard disk drive (HDD) 906, random access memory (RAM) and/or read only memory (ROM) 908, a keyboard 910, a mouse 912, a display 914, and a communication interface 916, which are connected to a system bus 902.

In one embodiment, the HDD 906, has capabilities that include storing a program that can execute various processes, such as the update recommendation engine 940, in a manner described herein. Generally, the recommendation engine 940 may be configured to analyze computing devices for projected stability after a software upgrade under the embodiments described above. The recommendation engine 940 may have various modules configured to perform different functions. In some embodiments, the recommendation engine 940 may include sub-modules. For example, an NLP analyzer 942, a chemical reaction analyzer 944, a chemical substance analyzer 946, and an experiment design analyzer 948.

In one embodiment, the HDD 906 can store an executing application that includes one or more library software modules, such as those for the Java™ Runtime Environment program for realizing a JVM (Java™ virtual machine).

Example Cloud Platform

As discussed above, functions relating to analyzing the impact of a software upgrade on a computing device, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
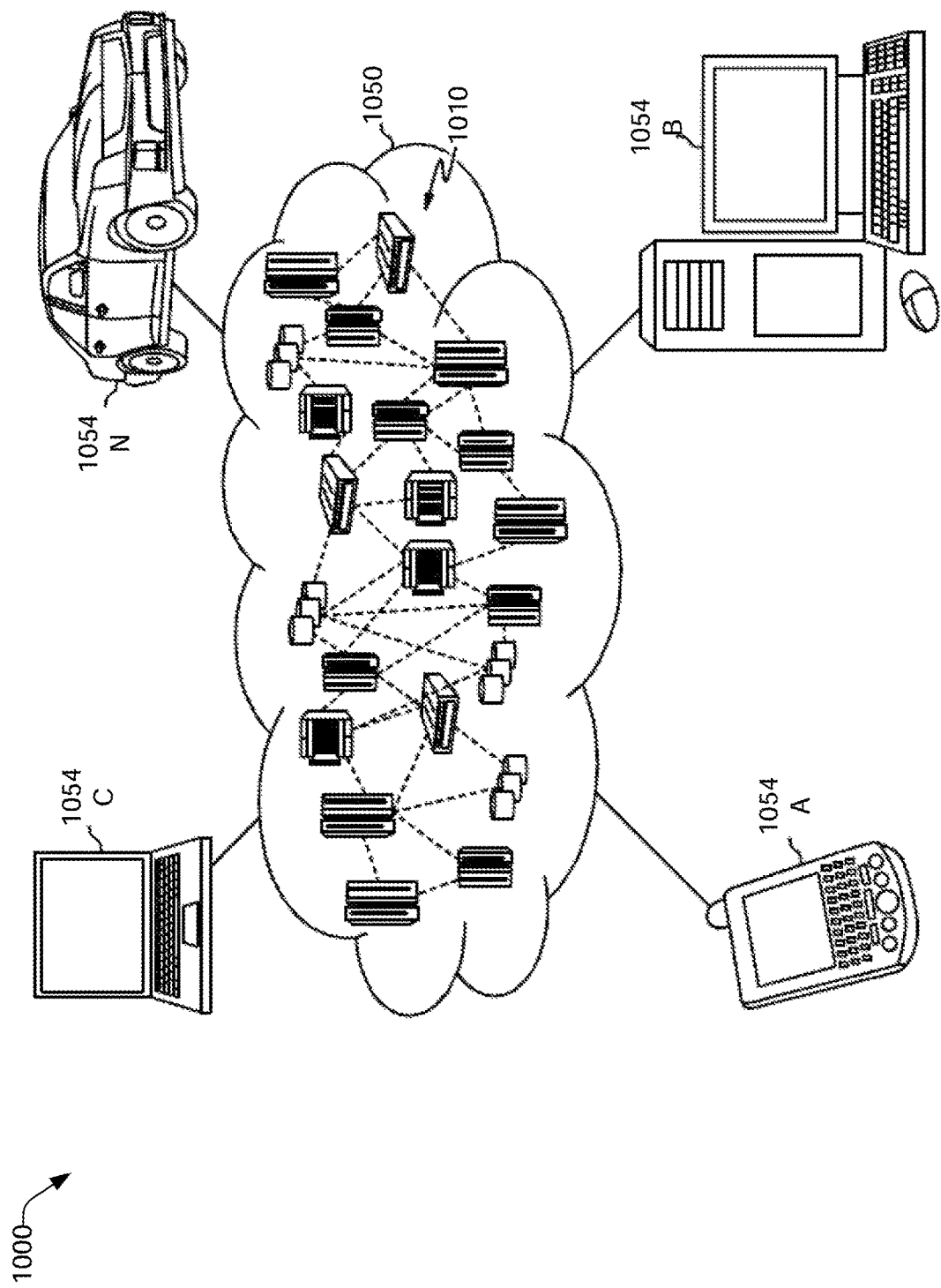
FIG. 10 depicts a cloud computing environment, consistent with an illustrative embodiment.

Referring now to FIG. 10, an illustrative cloud computing environment 1000 is depicted. As shown, cloud computing environment 1000 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1010 and cloud computing environment 1050 can communicate with any type of computerized device over any type of network and/or network addressable connection (e.g., using a web browser).

Figure 11:
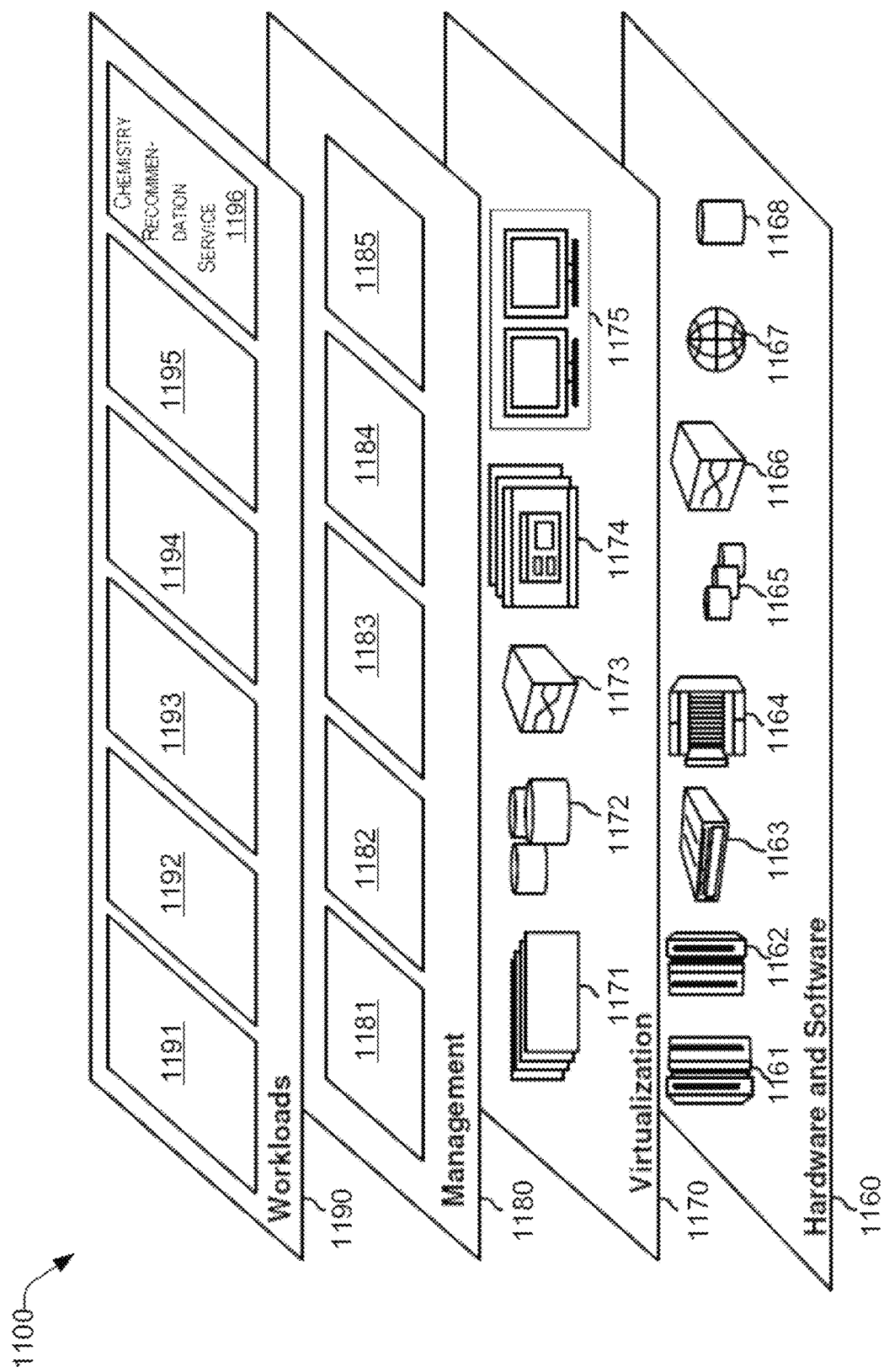
FIG. 11 depicts abstraction model layers, consistent with an illustrative embodiment.

Referring now to FIG. 11, a set of functional abstraction layers provided by cloud computing environment 1050 (FIG. 10) is shown. It should be understood in advance that the components, layers, and functions shown in FIG. 11 are intended to be illustrative only and embodiments of the disclosure are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and chemistry recommendation service 1196, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for generating query results, comprising:
   generating, by a computer processor, a training model through artificial intelligence, wherein the training model is based on annotated data extracted from a training set of documents;
   generating a knowledge base for a subject matter based on the training model, wherein the knowledge base is based on content from a plurality of document sources related to the subject matter;
   receiving, by the computer processor, a natural language query input from a user;
   inferring, by the computer processor, an intent and requirements for satisfying the intent from the natural language query input;
   referencing, by the computer processor, the knowledge base to extract information related to the intent and requirements for satisfying the intent, from documents in the knowledge base;
   identifying verbs in the documents;
   correlating the identified verbs with chemistry related actions;

determining chemical reactions from the documents based on the correlation between the identified verbs with chemistry related actions;
correlating relationships between the extracted information and the requirements for satisfying the intent, from the documents in the knowledge base; and
generating query results displayed to the user, wherein the query results are based on the correlated relationships.

2. The method of claim 1, wherein the extracted information includes synthetic 2. language representations of chemical substances.

3. The method of claim 1, further comprising generating a suggested query string based on the documents, wherein the documents are gathered from published papers, a corpus of papers representing a calibration standard for the content, and/or saved search data.

4. The method of claim 1, further comprising identifying names of chemical substances and/or synthetic language representing chemical substances from the extracted information, wherein the identification is based on stored data matching extracted text and/or symbols stored in the knowledge base.

5. The method of claim 1, further comprising:
running a categorization process on the documents; and
determining a category of topic for respective documents from the categorization process.

6. The method of claim 1, wherein the extracted information includes simplified molecular-input line-entry system unique codes from text and symbols in the documents.

7. The method of claim 1, further comprising determining a list of chemical products related to the determined chemical reactions.

8. A computer implemented method for generating query results, comprising:
generating, by a computer processor, a training model through artificial intelligence, wherein the training model is based on annotated data extracted from a training set of documents;
generating a knowledge base for a subject matter based on the training model, wherein the knowledge base is based on content from a plurality of document sources related to the subject matter;
receiving, by the computer processor, a natural language query input from a user;
inferring, by the computer processor, an intent and requirements for satisfying the intent from the natural language query input;
referencing, by the computer processor, the knowledge base to extract information related to the intent and requirements for satisfying the intent, from documents in the knowledge base;
identifying equipment in the documents;
referencing manufacturer equipment data for the identified equipment;
determining a cost for a chemical process in the documents, wherein the cost is based on pricing found associated with the manufacturer equipment data;
correlating relationships between the extracted information and the requirements for satisfying the intent, from the documents in the knowledge base; and
generating query results displayed to the user, wherein the query results are based on the correlated relationships.

9. A computer program product for generating query results, the computer program product comprising:
one or more non-transitory computer readable storage media, and program instructions collectively stored on the one or more computer readable storage media, the program instructions comprising:
generating by a computer processor, a training model through artificial intelligence, wherein the training model is based on annotated data extracted from a training set of documents;
generating a knowledge base for a subject matter based on the training model, wherein the knowledge base is based on content from a plurality of document sources related to the subject matter;
receiving by the computer processor, a natural language query input from a user;
inferring by the computer processor, an intent and requirements for satisfying the intent from the natural language query input;
referencing by the computer processor, the knowledge base to extract information related to the intent and requirements for satisfying the intent, from documents in the knowledge base;
identifying verbs in the documents;
correlating the identified verbs with chemistry related actions;
determining chemical reactions from the documents based on the correlation between the identified verbs with chemistry related actions;
correlating relationships between the extracted information and the requirements for satisfying the intent, from the documents in the knowledge base; and
generating query results displayed to the user, wherein the query results are based on the correlated relationships.

10. The computer program product of claim 9, wherein the extracted information includes synthetic language representations of chemical substances.

11. The computer program product of claim 9, wherein the program instructions further comprise generating a suggested query string based on the documents, wherein the documents are gathered from published papers, a corpus of papers representing a calibration standard for the content, and/or saved search data.

12. The computer program product of claim 9, wherein the program instructions further comprise identifying names of chemical substances and/or synthetic language representing chemical substances from the extracted information, wherein the identification is based on stored data matching extracted text and/or symbols stored in the knowledge base.

13. The computer program product of claim 9, wherein the program instructions further comprise:
running a categorization process on the documents; and
determining a category of topic for respective documents from the categorization process.

14. The computer program product of claim 9, wherein the extracted information includes simplified molecular-input line-entry system unique codes from text and symbols in the documents.

15. A computer program product for generating query results, the computer program product comprising:
one or more non-transitory computer readable storage media, and program instructions collectively stored on the one or more computer readable storage media, the program instructions comprising:
generating by a computer processor, a training model through artificial intelligence, wherein the training model is based on annotated data extracted from a training set of documents;
generating a knowledge base for a subject matter based on the training model, wherein the knowledge base is based on content from a plurality of document sources related to the subject matter;

receiving by the computer processor, a natural language query input from a user;

inferring by the computer processor, an intent and requirements for satisfying the intent from the natural language query input;

referencing by the computer processor, the knowledge base to extract information related to the intent and requirements for satisfying the intent, from documents in the knowledge base;

identifying equipment in the documents;

referencing manufacturer equipment data for the identified equipment;

determining a cost for a chemical process in the documents, wherein the cost is based on pricing found associated with the manufacturer equipment data;

correlating relationships between the extracted information and the requirements for satisfying the intent, from the documents in the knowledge base; and generating query results displayed to the user, wherein the query results are based on the correlated relationships.

16. A computer server for generating query results, comprising:

a network connection;

one or more computer readable storage media;

a processor coupled to the network connection and coupled to the one or more computer readable storage media; and a computer program product comprising program instructions collectively stored on the one or more computer readable storage media, the program instructions comprising:

generating by the computer processor, a training model through artificial intelligence, wherein the training model is based on annotated data extracted from a training set of documents;

generating a knowledge base for a subject matter based on the training model, wherein the knowledge base is based on content from a plurality of document sources related to the subject matter;

receiving by the computer processor, a natural language query input from a user;

inferring by the computer processor, an intent and requirements for satisfying the intent from the natural language query input;

referencing by the computer processor, the knowledge base to extract information related to the intent and requirements for satisfying the intent, from documents in the knowledge base;

identifying verbs in the documents;

correlating the identified verbs with chemistry related actions;

determining chemical reactions from the documents based on the correlation between the identified verbs with chemistry related actions;

correlating relationships between the extracted information and the requirements for satisfying the intent, from the documents in the knowledge base; and generating query results displayed to the user, wherein the query results are based on the correlated relationships.

17. The computer server of claim 16, wherein the program instructions further comprise:

identifying materials from the extracted information, wherein the identification is based on stored data matching extracted text and/or symbols in the extracted information stored in the knowledge base.

\* \* \* \* \*